United States Patent
Nakamura

(10) Patent No.: US 10,623,603 B1
(45) Date of Patent: Apr. 14, 2020

(54) IMAGE PROCESSING APPARATUS, NON-TRANSITORY COMPUTER READABLE RECORDING MEDIUM THAT RECORDS AN IMAGE PROCESSING PROGRAM, AND IMAGE PROCESSING METHOD

(71) Applicant: KYOCERA DOCUMENT SOLUTIONS INC., Osaka (JP)

(72) Inventor: Masayoshi Nakamura, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/426,170

(22) Filed: May 30, 2019

(51) Int. Cl.
*H04N 1/387* (2006.01)
*G06K 9/32* (2006.01)
*H04N 1/00* (2006.01)

(52) U.S. Cl.
CPC ......... *H04N 1/3878* (2013.01); *G06K 9/3283* (2013.01); *H04N 1/00331* (2013.01); *H04N 1/00639* (2013.01)

(58) Field of Classification Search
CPC ............. H04N 1/3878; H04N 1/00331; H04N 1/00639; G06K 9/3283
See application file for complete search history.

(56) References Cited

U.S. PATENT DOCUMENTS

| | | | | |
|---|---|---|---|---|
| 7,768,676 B2 * | 8/2010 | Kimura | .................... | G06K 9/03 345/604 |
| 8,730,530 B2 * | 5/2014 | Muroi | ................ | H04N 1/00795 270/58.08 |

FOREIGN PATENT DOCUMENTS

| | | | |
|---|---|---|---|
| JP | 2002-051218 | A | 2/2002 |
| JP | 2014-068243 | A | 4/2014 |
| JP | 2015-198306 | A | 11/2015 |
| JP | 2016-158113 | A | 9/2016 |
| JP | 2017-028447 | A | 2/2017 |

\* cited by examiner

*Primary Examiner* — Quang N Vo
(74) *Attorney, Agent, or Firm* — Li & Cai Intellectual Propeny (USA) Office

(57) ABSTRACT

In an image processing apparatus, a fold determining unit is configured to determine that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

15 Claims, 6 Drawing Sheets

| Character string number (201) | Inclination (°) (-90° to 90°) (202) | Length (pixel width) (203) | Validity (204) |
|---|---|---|---|
| 1 | 0 | 100 | Valid |
| 2 | 0 | 240 | Valid |
| 3 | 4.5 | 10 | Invalid |
| 4 | -0.5 | 400 | Valid |
| 5 | 1.0 | 1355 | Valid |
| ... | ... | ... | ... |

200

300

| | Character string number (201) | Inclination (°) (-90° to 90°) (202) | Length (pixel width) (203) | Validity (204) |
|---|---|---|---|---|
| G1 { T1 | 32 | 0 | 1438 | Valid |
| T2 | 33 | 0 | 1134 | Valid |
| T3 | 34 | 0 | 771 | Valid |
| T4 | 35 | 0 | 314 | Valid |
| G2 { T5 | 36 | -2.5 | 1511 | Valid |
| T6 | 37 | -2.5 | 803 | Valid |
| T7 | 38 | -2.5 | 1777 | Valid |
| | ... | ... | ... | ... |

200

IMAGE PROCESSING APPARATUS, NON-TRANSITORY COMPUTER READABLE RECORDING MEDIUM THAT RECORDS AN IMAGE PROCESSING PROGRAM, AND IMAGE PROCESSING METHOD

BACKGROUND OF THE INVENTION

1. Field of the Invention

The present disclosure relates to an image processing apparatus that processes a read image, which is generated by optically reading a document by an image scanner.

2. Description of Related Art

An image scanner optically reads a document and generates a read image.

SUMMARY OF THE INVENTION

According to an embodiment of the present disclosure, there is provided an image processing apparatus, including:
 a controller circuit configured to operate as
 an image obtaining unit configured to obtain a read image, the read image being generated by optically reading a document including multiple characters by an image scanner,
 a character string determining unit configured to
  detect multiple character strings from the read image, each of the multiple character strings including multiple characters arrayed in one direction, the multiple character strings being arrayed in series in a direction that crosses the one direction, and
  determine an inclination of each of the multiple character strings with respect to the read image, and
 a fold determining unit configured to
  determine a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and
  determine that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

According to an embodiment of the present disclosure, there is provided a non-transitory computer readable recording medium that records an image processing program causing a controller circuit of an image processing apparatus to operate as:
 an image obtaining unit configured to obtain a read image, the read image being generated by optically reading a document including multiple characters by an image scanner;
 a character string determining unit configured to
  detect multiple character strings from the read image, each of the multiple character strings including multiple characters arrayed in one direction, the multiple character strings being arrayed in series in a direction that crosses the one direction, and
  determine an inclination of each of the multiple character strings with respect to the read image; and
 a fold determining unit configured to
  determine a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and
  determine that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

According to an embodiment of the present disclosure, there is provided an image processing method, including:
 by an image obtaining unit, obtaining a read image, the read image being generated by optically reading a document including multiple characters by an image scanner;
 by a character string determining unit,
  detecting multiple character strings from the read image, each of the multiple character strings including multiple characters arrayed in one direction, the multiple character strings being arrayed in series in a direction that crosses the one direction, and
  determining an inclination of each of the multiple character strings with respect to the read image; and
 by a fold determining unit,
  determining a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and
  determining that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 4 shows an example of a read image;

FIG. 5 shows an example of the read image, from which handwritten characters are removed;

FIG. 6 shows an example of multiple character strings detected from the read image;

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
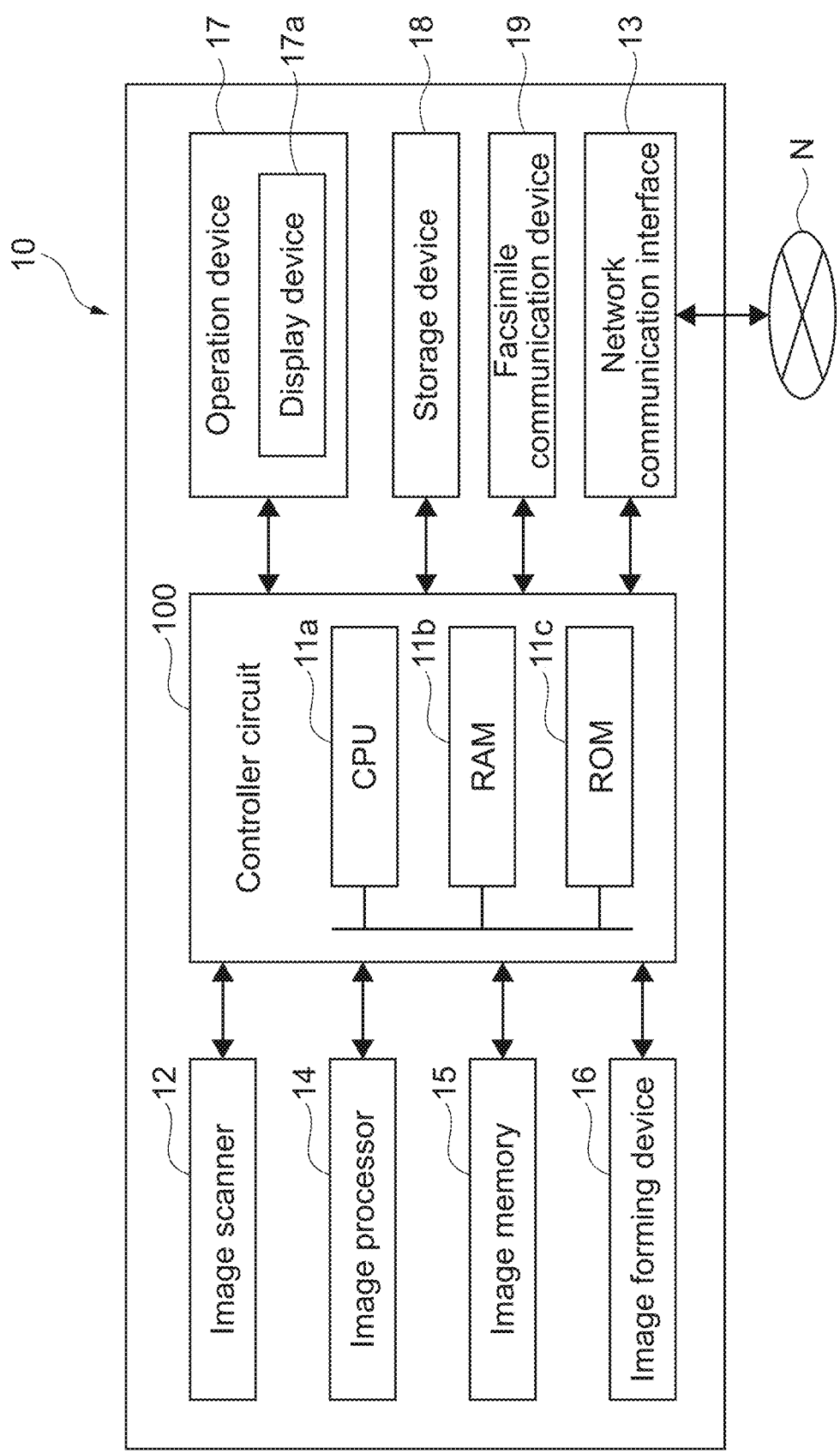
FIG. 1 shows a hardware configuration of an image forming apparatus according to an embodiment of the present disclosure.

FIG. 1 shows a hardware configuration of an image forming apparatus according to an embodiment of the present disclosure.

According to the present embodiment, the image forming apparatus 10 (for example, MFP, Multifunction Peripheral) including the image scanner I2 will be described as an example of an image processing apparatus. However, an image processing apparatus may be an information processing apparatus (personal computer, tablet computer, smartphone, etc.) (not shown) configured to receive a read image, which is generated by optically reading a document by an external image forming apparatus (not shown). In this case, the information processing apparatus may receive the read image by directly communicating with the external image forming apparatus. Alternatively, the information processing apparatus may download the read image, which is uploaded onto a server apparatus or the like (not shown) by the external image forming apparatus.

The image forming apparatus 10 includes the controller circuit 100. The controller circuit 100 includes the CPU (Central Processing Unit) 11a (processor), the RAM (Random Access Memory) 11b, the ROM (Read Only Memory) 11c (memory), dedicated hardware circuits, and the like and performs overall operational control of the image forming apparatus 10. The CPU 11a loads information processing programs (including image processing program) stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuit 100 is connected to the image scanner I2, the image processor 14 (including GPU (Graphics Processing Unit)), the image memory 15, the image forming device 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 including the display device 17a (touch panel) is an embodiment of an input device. A sound input device including a microphone may be provided as an input device.

In the present embodiment, the image scanner 12 optically reads a document, and generates an image (hereinafter referred to as read image). In the present embodiment, the document optically read by the image scanner 12 includes multiple characters. Typically, the "characters" are text data generated by using word processor software and printed on a medium (typically, paper). The "characters" do not include handwritten characters. The document includes, as the multiple characters, multiple character strings, each of the multiple character strings including multiple characters arrayed in one direction (for example, lateral direction), the multiple character strings being arrayed in series in a direction example, longitudinal direction) that crosses (typically, perpendicularly) the one direction. The "document" simply means a physical medium (typically, paper) in the present embodiment.

The image scanner I2 optically reads a document fed by an automatic feeder or a document put on a platen (not shown) by a user.

2. Functional Configuration of Image Forming Apparatus

Figure 2:
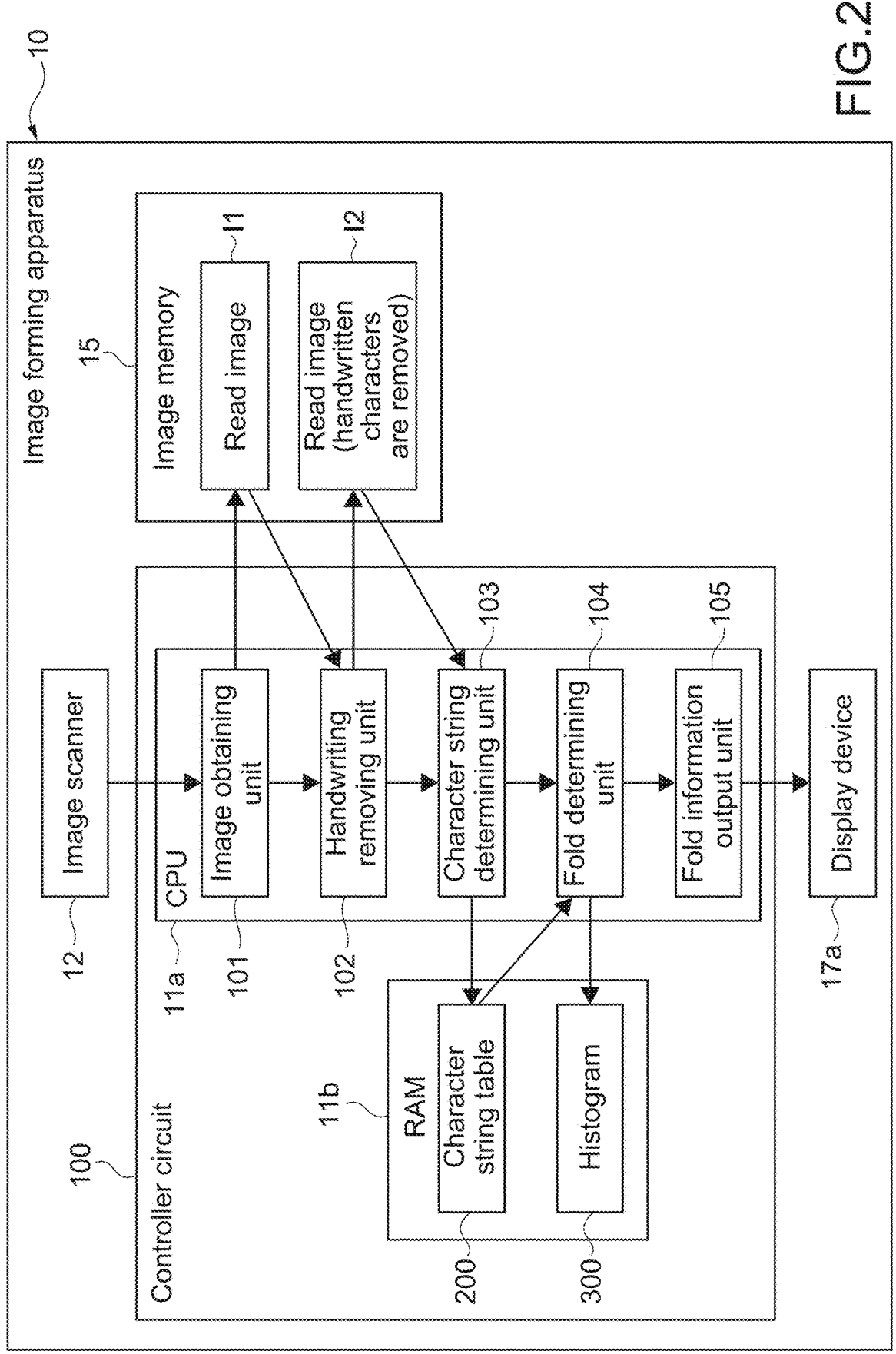
FIG. 2 shows a functional configuration of the image forming apparatus.

FIG. 2 shows a functional configuration of the image forming apparatus.

In the controller circuit 100 of the image forming apparatus 10, the CPU 11a loads an image processing program stored in the ROM 11c in the RAM 11b and executes the image processing program to thereby operate as the image obtaining unit 101, the handwriting removing unit 102, the character string determining unit 103, the fold determining unit 104, and the fold information output unit 105.

3. Operational Flow of Image Forming Apparatus

Figure 3:
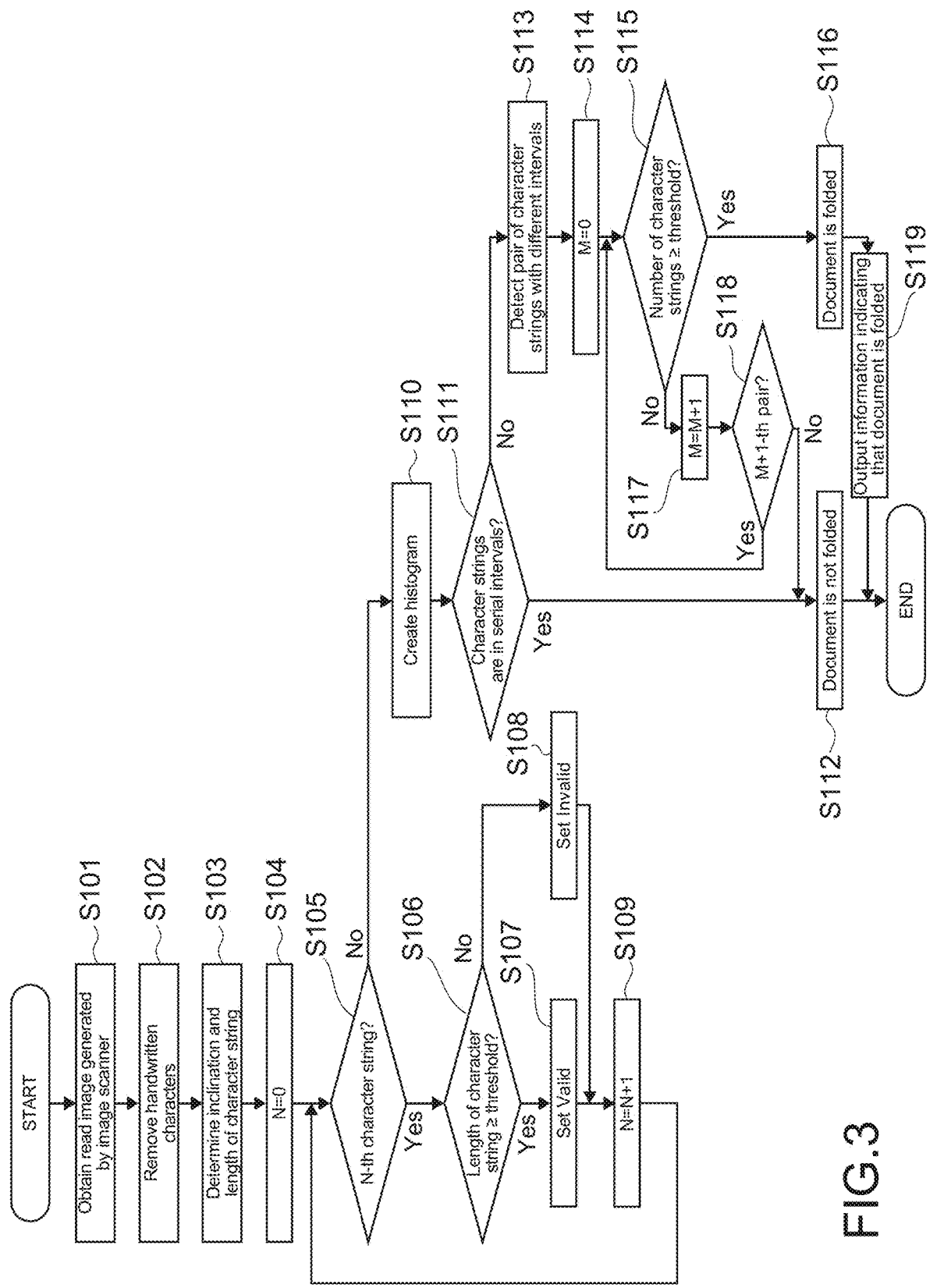
FIG. 3 shows an operational flow of the image forming apparatus.

FIG. 3 shows an operational flow of the image forming apparatus.

The image obtaining unit 101 obtains the read image I1 generated by optically reading a document by the image scanner I2 (Step S101).

Figure 4:
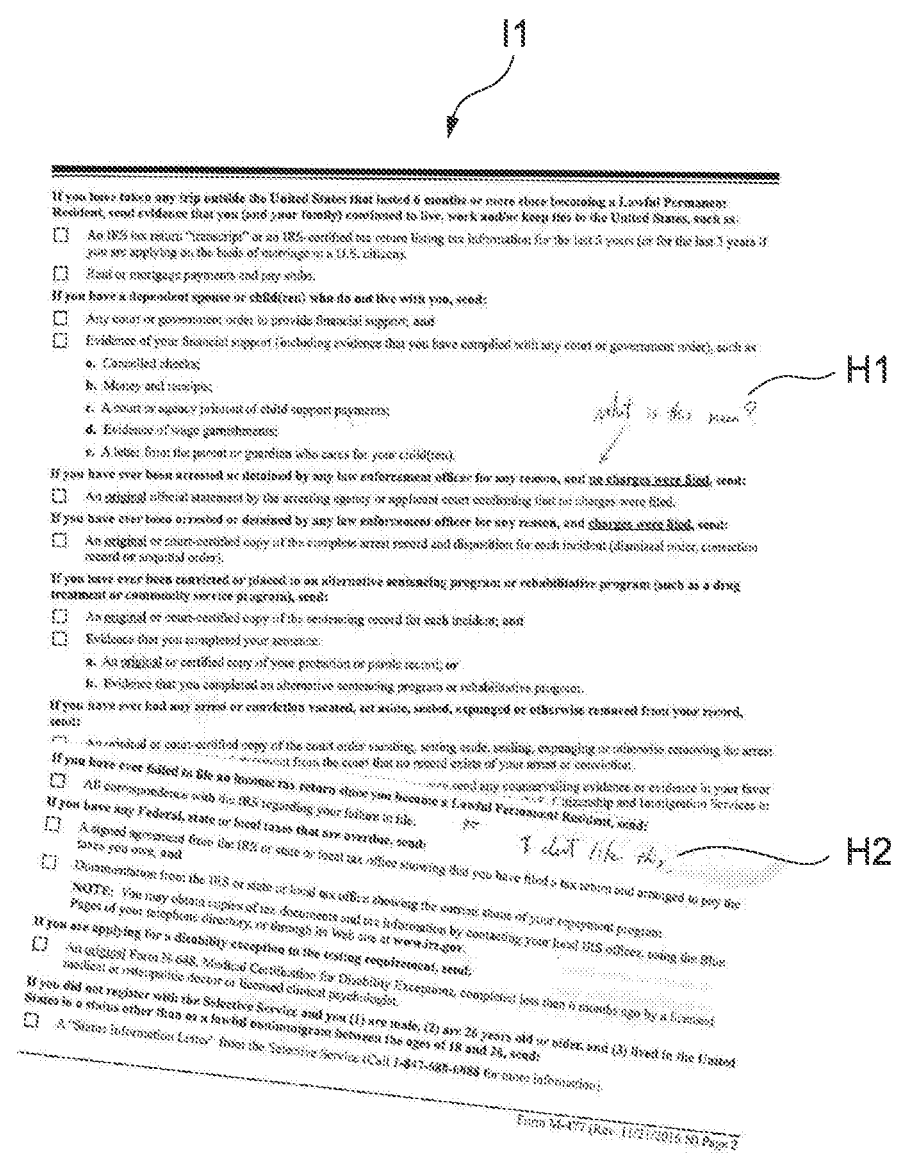

FIG. 4 shows an example of a read image.

In FIG. 4, the read image I1 includes the handwritten characters H1 and H2.

The handwriting removing unit 102 detects the handwritten characters H1 and H2 from the read image I1 by using a known art (edge detection, etc.). If the handwriting removing unit 102 detects the handwritten characters H1 and H2, the handwriting removing unit 102 removes the handwritten characters H1 and H2 from the read image I1 (Step S102). Note that, if the read image includes no handwritten character (no handwritten character is detected), the handwriting removing unit 102 removes no handwritten character from the read image.

Figures 5, 6:
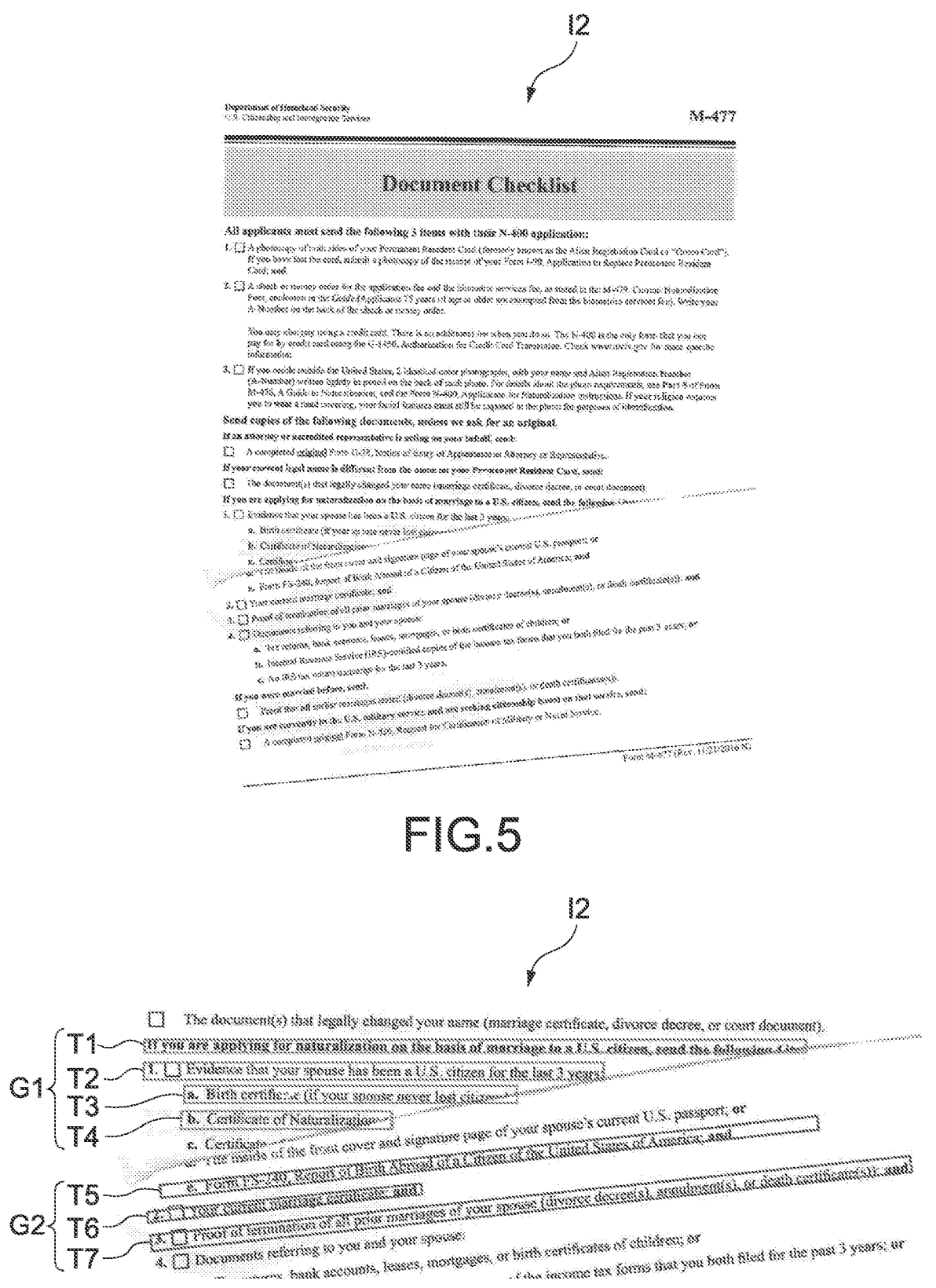

FIG. 5 shows an example of the read image, from which handwritten characters are removed.

In FIG. 5, the read image I2 is generated by removing the handwritten characters H1 and H2 from the read image I1 (FIG. 4).

The character string determining unit 103 detects multiple character strings from the read image I2, from which the handwritten characters H1 and H2 are removed. The "multiple character strings" are multiple character strings, each of the multiple character strings including multiple characters arrayed in one direction (for example, lateral direction), the multiple character strings being arrayed in series in a direction example, longitudinal direction) that crosses (typically, perpendicularly) the one direction.

FIG. 6 shows an example of multiple character strings detected from the read image.

FIG. 6 shows the multiple character strings T1 to T7 . . . detected from part of the read image I2 (FIG. 5), from which the handwritten characters H1 and H2 are removed.

The character string determining unit 103 determines the inclination and the length of each of the multiple character strings T1 to T7 . . . included in the read image I2. The "length of a character string" means the length of a character string in the aforementioned one direction (for example, lateral direction), i.e., the length in the direction in which multiple characters are arrayed. The "inclination of a character string" means the inclination of the aforementioned one direction (for example, lateral direction), in which the multiple characters of the character string are arrayed, with respect to an arbitrary reference (for example, coordinate system of read image). The character string determining unit 103 records the inclination and the length of each of the multiple character strings as the character string table 200 in, for example, the RAM 11b (Step S103).

Figures 7, 8, 9:
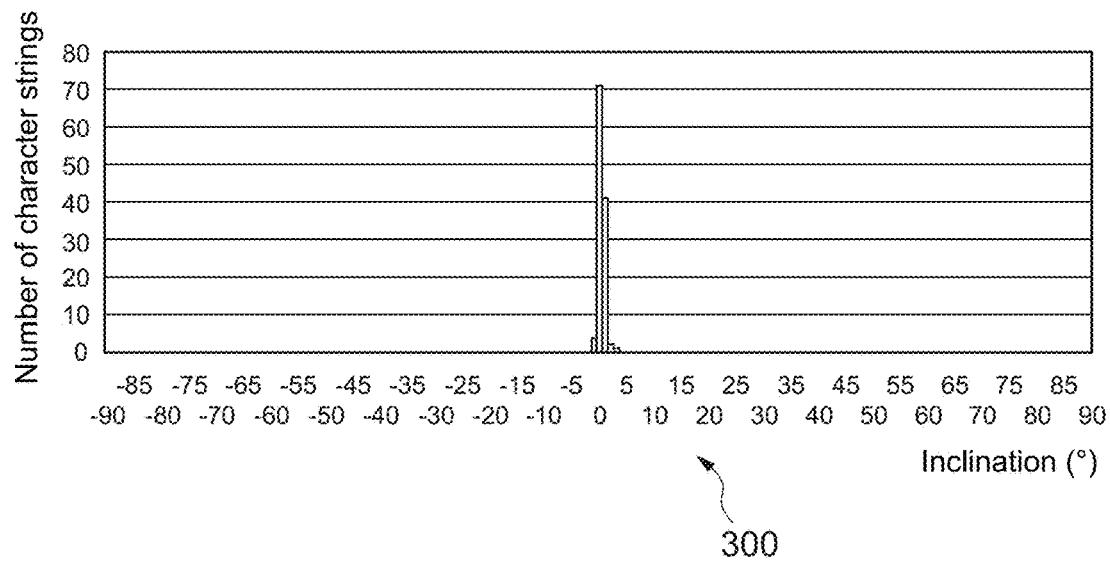
FIG. 7 shows a part of a character string table of an example.
FIG. 8 shows an example of a histogram.
FIG. 9 shows another part of a character string table of an example.

FIG. 7 shows a part of a character string table of an example.

The character string table 200 records, for each character string, the character string number 201, the inclination 202, the length 203, and the validity 204. Note that, in FIG. 7, the respective character strings recorded in the character string table 200 are different from the character strings T1 to T7 . . . (FIG. 6) included in the read image I2. The character string number 201 is a serial number that uniquely identifies each character string and, in addition, identifies the serial order of each character string. The inclination 202 is an angle of −180° to 180°, where the lateral direction of the coordinate system of a read image is 0° (reference), for example. The length 203 is, for example, a pixel width of a character string. The value of the validity 204 is null at the time (Step S103) of generating the character string table 200.

The character string determining unit 103 determines whether or not the length 203 (length in one direction) of each character string is equal to or larger than a threshold (third threshold) (Step S106) for all the character strings (the number of the character strings=N) recorded in the character string table 200 (Steps S104, S105, and S109). The threshold is, for example, 50 pixel width. If the character string determining unit 103 determines that the length 203 of each character string is equal to or larger than the threshold (Step S106, Yes), the character string determining unit 103 records "Valid" as the validity 204 in the character string table 200 (Step S107). Meanwhile, if the character string determining unit 103 determines that the length 203 of each character string is smaller than the threshold (Step S106, No), the character string determining unit 103 records "Invalid" as the validity 204 in the character string table 200 (Step S108). The "Valid" means that the inclination 202 of a character string is valid, i.e., the probability that the inclination 202 is accurate is relatively high, since the length 203 of the character string is equal to or larger than the threshold (character string is relatively long). Meanwhile, the "Invalid" means that the probability that the inclination 202 is inaccurate (detected wrong) is relatively high, since the length 203 of the character string is smaller than the threshold (character string is short).

In the example of FIG. 7, the character string determining unit 103 records "Invalid" for the validity 204 of the character string (character string identified by the character string number 201=3) that has the length 203 smaller than the threshold (50 pixel width) (Step S108). Meanwhile, the character string determining unit 103 records "Valid" for the validity 204 of the character strings (multiple character strings identified by the character string number 201=1, 2, 4, and 5) that have the length 203 equal to or larger than the threshold (50 pixel width) (Step S107).

The fold determining unit 104 creates a histogram of the inclinations 202 of all the character strings, for which "Valid" is recorded for the validity 204 in the character string table 200 (Step S110). Specifically, the fold determining unit 104 determines an interval, in which the inclination (°) of each character string is included.

FIG. 8 shows an example of a histogram.

In FIG. 8, the histogram 300 shows a distribution of inclinations of multiple character strings, where the inclination interval=1° and the range of angle=−90° to 90°, for example. "The inclination interval=1°" means that one interval includes inclinations equal to or larger than 0° and smaller than 1°. Note that the inclination interval may be a value other than 1° and may be 0.5°, for example. Note that, in FIG. 8, the respective character strings included in the histogram are different from the character strings recorded in the character string table 200 (FIG. 7) and different from the character strings T1 to T7 . . . included in the read image I2 (FIG. 6).

The fold determining unit 104 determines whether or not a ratio is equal to or larger than a threshold (fourth threshold) (for example, arbitrary value equal to or larger than 60%), the ratio being a ratio of the number of one or more character strings having one or more inclinations included in a predetermined number (for example, arbitrary value equal to or smaller than 5) of serial intervals to the total number of the multiple character strings (Step S111). The case that "a ratio is equal to or larger than the threshold, the ratio being a ratio of the number of one or more character strings having one or more inclinations included in a predetermined number of serial intervals to the total number of the multiple character strings" (Step S111, Yes) means that the inclinations of the many character strings included in the read image are approximately the same, i.e., the document is not folded (alternatively, the probability that at least part including the character strings is not folded is high) (Step S112). Meanwhile, the case that "a ratio is smaller than the threshold, the ratio being a ratio of the number of one or more character strings having one or more inclinations included in a predetermined number of serial intervals to the total number of the multiple character strings" (Step S111, No) means that the inclinations of the many character strings included in the read image have variations, i.e., there is a probability that the document is folded.

In the example of FIG. 8, the ratio (93%) is equal to or larger than the threshold (for example, 90%), the ratio (93%) being a ratio of the number (71+41) of one or more character strings having one or more inclinations included in a predetermined number (2 in this example) of serial intervals (interval equal to or larger than −1° and smaller than 0°, and interval equal to or larger than 0° and smaller than 1°) to the total number (120) of the multiple character strings (Step S111, Yes). Therefore the fold determining unit 104 determines that the document is not folded (alternatively, probability that at least part including character strings is not folded is high) (Step S112).

Note that the number of serial intervals and the value of the threshold are arbitrarily determined. However, typically, where the number of serial intervals is smaller (for example, 1), the threshold is a smaller value (for example, 60%). To the contrary, typically, where the number of serial intervals is larger (for example, 3), the threshold is a larger value (for example, 90%).

Meanwhile, the case that a ratio is smaller than the threshold, the ratio being a ratio of the number of one or more character strings having one or more inclinations included in a predetermined number of serial intervals to the total number of the multiple character strings (Step S111, No) will be described. In this case, with reference to the inclination 202 recorded in the character string table 200, the fold determining unit 104 detects pairs (the number of pairs=M) of two adjacent (serial) character strings, the interval including the inclination of one character string being different from the interval including the inclination of the other character string (Step S113).

FIG. 9 shows another part of a character string table of an example.

In FIG. 9, the respective character strings recorded in the character string table 200 are the character strings T1 to T7 (FIG. 6) included in the read image I2. Specifically, the character string T1 is identified by the character string number 201=32. The character string T2 is identified by the character string number 201=33. The character string T3 is identified by the character string number 201=34. The character string T4 is identified by the character string number 201=35. The character string T5 is identified by the character string number 201=36. The character string T6 is identified by the character string number 201=37. The character string T7 is identified by the character string number 201=38.

In the example of FIG. 9, the interval of numerical values (first inclination interval), which includes the value of the inclination 202 of the character string T4 (first character string)=0°, is equal to or larger than 0° and smaller than 1° (where interval is 1°. Meanwhile, the interval of numerical values (first inclination interval), which includes the value of the inclination 202 of the character string T5 (second character string)=−2.5°, is equal to or larger than −3° and smaller than −2° (where interval is 1°). Therefore the interval of numerical values (first inclination interval), which includes the value of the inclination 202 of the character string T4 (first character string)=0°, is different from the interval of numerical values (first inclination interval), which includes the value of the inclination 202 of the character string T5 (second character string)=−2.5°. Therefore the fold determining unit 104 detects, as a pair of two adjacent (serial) character strings, the interval including the inclination of one character string being different from the interval including the inclination of the other character string, the character string T4 (first character string) identified by the character string number 201=35 and the character string T5 (second character string) identified by the character string number 201=36 (Step S113).

The fold determining unit 104 determines the number of one or more character strings (character strings in the first group G1) including the first character string, which are arrayed in series and have an inclination included in the first inclination interval. In the example of FIG. 9, the fold determining unit 104 determines the number (4) of one or more character strings (character strings in the first group G1) (the character strings T1, T2, T3, and T4 identified by the character string numbers 201=32, 33, 34, and 35) including the first character string (the character string T4 the character string number 201=35), which are arrayed in series and have an inclination included in the first inclination interval (equal to or larger than −3° and smaller than −2°. The fold determining unit 104 determines whether or not the number (4) of the character strings in the first group G1 is equal to or larger than the first threshold (for example, 3).

Meanwhile, the fold determining unit 104 determines the number of one or more character strings (character strings in the second group G2) including the second character string, which are arrayed in series and have an inclination included in the second inclination interval. In the example of FIG. 9, the fold determining unit 104 determines the number (3) of one or more character strings (character strings in the second group G2) (the character strings T5, T6, and T7 identified by the character string numbers 201=36, 37, and 38) including the second character string (the character string T5 the character string number 201=36), which are arrayed in series and have an inclination included in the second inclination interval (equal to or larger than −3° and smaller than −2°). The fold determining unit 104 determines whether or not the number (3) of the character strings in the second group G2 is equal to or larger than the second threshold (for example, 3).

Note that the first threshold may be the same as or different from the second threshold.

In this example, the fold determining unit 104 determines that the number (4) of the character strings in the first group G1 is equal to or larger than the first threshold (for example, 3) and, in addition, determines that the number (3) of the character strings in the second group G2 is equal to or larger than the second threshold (for example, 3) (Step S115, Yes). In this case, the fold determining unit 104 determines that the document is folded (alternatively, the probability that at least part including the character strings is folded is high) (Step S116).

By the way, according to a conceivable case, there is no pair of character strings, which satisfies the condition (Step S115) in which the number of the character strings in the first group G1 is equal to or larger than the first threshold and the number of the character strings in the second group G2 is equal to or larger than the second threshold, in all (Steps S114 and S117) the pairs (the number of pairs=M) of character strings (Step S118, No). In this case, the fold determining unit 104 determines that the document is not folded or readability is not affected even if the document is folded (Step S112).

If the document is folded (alternatively, at least the probability that the document is folded is high) (Step S116), the fold information output unit 105 outputs (for example, displays on the display device 17*a*) information indicating that the document is folded (Step S119). The "information indicating that the document is folded" includes, for example, a message for urging a user to re-scan the document.

Alternatively, the "information indicating that the document is folded" includes the result of optical character recognition (OCR) of the read image 12 and a message for urging a user to check the result.

Note that, where multiple pages of documents are scanned, typically, if the fold information output unit 105 determines that one page of document is folded (alternatively, at least the probability that the document is folded is high), the fold information output unit 105 may output the information indicating that the document is folded before starting the operational flow (on and after Step S101) for the next page.

4. Conclusion (1) According to the present embodiment, the fold determining unit 104 determines that the document is folded if it is determined that a number of one or more character strings included in the first group G1 is equal to or larger than a first threshold and if a number of one or more character strings included in the second group G2 is equal to or larger than a second threshold, the first group G1 including multiple character strings T1 to T4 including the first character string T4, which are arrayed in series and have the inclination 202 included in the first inclination interval, the second group G2 including multiple character strings T5 to T7 including the second character string T5, which are arrayed in series and have the inclination 202 included in the second inclination interval (Step S115, Yes). In short, the fold determining unit 104 determines that a document is folded where multiple character strings having a common first inclination interval and multiple character strings having a common second inclination interval, which is different from the first inclination interval, are arrayed in series. Therefore the fold determining unit 104 may determine that a document is folded with a high degree of precision.

(2) According to the present embodiment, the character string determining unit 103 determines that a character string having a length smaller than a third threshold in one direction (Step S106, No) is invalid out of the character strings (Step S108). As a result, a character string, which has a relatively high probability that the inclination 202 is inaccurate (detected wrong) since the length 203 of the character string is smaller than the threshold (character string is short), is excluded from character strings whose inclinations are to be determined. As a result, the probability that it is improperly determined that a document is folded even if the document is not folded actually may be reduced.

(3) According to the present embodiment, the fold determining unit 104 determines that the document is not folded (Step S112) if it is determined that a ratio is equal to or larger than a fourth threshold (Step S111, Yes), the ratio being a ratio of a number of one or more character strings having one or more inclinations included in a predetermined number of serial intervals to a total number of the multiple character strings. As a result, if the inclinations of the many character strings included in the read image are approximately the same, the fold determining unit 104 determines that the document is not folded (alternatively, the probability that at least part including the character strings is not folded is high). Therefore the fold determining unit 104 may determine that a document is not folded with a high degree of precision.

(4) According to the present embodiment, the character string determining unit 103 detects the multiple character strings (Step S103) from the read image I2 from which the handwritten characters H1 and H2 are removed (Step S102). The inclination of handwritten characters may be different from the inclination of printed character strings. Because of that, if character strings (including the handwritten characters H1 and H2) are detected from the read image I1 including the handwritten characters H1 and H2, since the inclinations of handwritten characters H1 and H2 are different from the inclination of prints character strings, it may be improperly determined that a document is folded even if the document is not folded actually. To the contrary, according to the present embodiment, the handwritten characters H1 and H2 are removed. As a result, the probability that it is improperly determined that a document is folded even if the document is not folded actually may be reduced.

(5) According to the present embodiment, fold information output unit 107 outputs information indicating that the document is folded (Step S119). As a result, a user may re-scan the document. Alternatively, a user may check, with the eyes, the result of optical character recognition (OCR) of the read image I2. Note that, where multiple pages of documents are scanned, if the fold information output unit 105 determines that one page of document is folded, the fold information output unit 105 may output the information indicating that the document is folded before starting the operational flow (on and after Step S101) for the next page. As a result, a user may know which page of document is folded. In other words, it is not necessary for the user to search all the pages of read images for a folded document page afterwards. So there is no loss of time.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a controller circuit configured to operate as
an image obtaining unit configured to obtain a read image, the read image being generated by optically reading a document including multiple characters by an image scanner,
a character string determining unit configured to
detect multiple character strings from the read image, each of the multiple character strings including multiple characters arrayed in one direction, the multiple character strings being arrayed in series in a direction that crosses the one direction, and
determine an inclination of each of the multiple character strings with respect to the read image, and
a fold determining unit configured to
determine a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and
determine that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

2. The image processing apparatus according to claim 1, wherein the character string determining unit is configured to determine that a character string having a length smaller than a third threshold in the one direction is invalid out of the character strings, and the fold determining unit is configured to exclude the character string determined invalid from the first character strings and the second character strings.

3. The image processing apparatus according to claim 1, wherein the fold determining unit is configured to determine an interval including the inclination of each of the multiple character strings, and determine that the document is not folded if it is determined that a ratio is equal to or larger than a fourth threshold, the ratio being a ratio of a number of one or more character strings having one or more inclinations included in a predetermined number of serial intervals to a total number of the multiple character strings.

4. The image processing apparatus according to claim 1, wherein the controller circuit is further configured to operate as a handwriting removing unit configured to remove a handwritten character from the read image, and the character string determining unit is configured to detect the multiple character strings from the read image from which the handwritten character is removed.

5. The image processing apparatus according to claim 1, wherein the controller circuit is further configured to operate as a fold information output unit configured to output, if it is determined that the document is folded by the fold determining unit, information indicating that the document is folded.

6. A non-transitory computer readable recording medium that records an image processing program causing a controller circuit of an image processing apparatus to operate as:

an image obtaining unit configured to obtain a read image, the read image being generated by optically reading a document including multiple characters by an image scanner;

a character string determining unit configured to detect multiple character strings from the read image, each of the multiple character strings including multiple characters arrayed in one direction, the multiple character strings being arrayed in series in a direction that crosses the one direction, and determine an inclination of each of the multiple character strings with respect to the read image; and a fold determining unit configured to determine a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and determine that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

7. The non-transitory computer readable recording medium according to claim 6, wherein the character string determining unit is configured to determine that a character string having a length smaller than a third threshold in the one direction is invalid out of the character strings, and the fold determining unit is configured to exclude the character string determined invalid from the first character strings and the second character strings.

8. The non-transitory computer readable recording medium according to claim 6, wherein the fold determining unit is configured to determine an interval including the inclination of each of the multiple character strings, and determine that the document is not folded if it is determined that a ratio is equal to or larger than a fourth threshold, the ratio being a ratio of a number of one or more character strings having one or more inclinations included in a predetermined number of serial intervals to a total number of the multiple character strings.

9. The non-transitory computer readable recording medium according to claim 6, wherein the image processing program further causes the controller circuit of the image processing apparatus to operate as a handwriting removing unit configured to remove a handwritten character from the read image, and the character string determining unit is configured to detect the multiple character strings from the read image from which the handwritten character is removed.

10. The non-transitory computer readable recording medium according to claim 6, wherein the image processing program further causes the controller circuit of the image processing apparatus to operate as a fold information output unit configured to output, if it is determined that the document is folded by the fold determining unit, information indicating that the document is folded.

11. An image processing method, comprising:

by an image obtaining unit, obtaining a read image, the read image being generated by optically reading a document including multiple characters by an image scanner;

by a character string determining unit, detecting multiple character strings from the read image, each of the multiple character strings including multiple characters arrayed in one direction, the multiple character strings being arrayed in series in a direction that crosses the one direction, and determining an inclination of each of the multiple character strings with respect to the read image; and by a fold determining unit, determining a first character string and a second character string, the first character string and the second character string being a pair of two adjacent character strings included in the multiple character strings, a first inclination interval being different from a second inclination interval, the first inclination interval being an interval of numerical values including an inclination value of the first character string, the second inclination interval being an interval of numerical values including an inclination value of the second character string, and determining that the document is folded if it is determined that a number of one or more character strings included in a first group is equal to or larger than a first threshold and if a number of one or more character strings included in a second group is equal to or larger than a second threshold, the first group including multiple character strings including the first character string, which are arrayed in series and have an inclination included in the first inclination interval, the second group including multiple character strings including the second character string, which are arrayed in series and have an inclination included in the second inclination interval.

12. The image processing method according to claim 11, further comprising:

by the character string determining unit, determining that a character string having a length smaller than a third threshold in the one direction is invalid out of the character strings; and by the fold determining unit, excluding the character string determined invalid from the first character strings and the second character strings.

13. The image processing method according to claim 11, further comprising:

by the fold determining unit, determining an interval including the inclination of each of the multiple character strings, and determining that the document is not folded if it is determined that a ratio is equal to or larger than a fourth threshold, the ratio being a ratio of a number of one or more character strings having one or more inclinations included in a predetermined number of serial intervals to a total number of the multiple character strings.

14. The image processing method according to claim 11, further comprising:

by a handwriting removing unit, removing a handwritten character from the read image; and by the character string determining unit, detecting the multiple character strings from the read image from which the handwritten character is removed.

15. The image processing method according to claim 11, further comprising:

by a fold information output unit, outputting, if it is determined that the document is folded by the fold determining unit, information indicating that the document is folded.

\* \* \* \* \*